(12) United States Patent
Jung

(10) Patent No.: US 10,498,188 B2
(45) Date of Patent: Dec. 3, 2019

(54) MOTORS WITH DAMPER FOR REDUCING VIBRATION AND NOISE OF ROTOR

(71) Applicant: Hyoseong Electric Co., Ltd., Busan (KR)

(72) Inventor: Jingeun Jung, Busan (KR)

(73) Assignee: Hyoseong Electric Co., Ltd., Busan (KR)

( * ) Notice: Subject to any disclaimer, the term of this patent is extended or adjusted under 35 U.S.C. 154(b) by 129 days.

(21) Appl. No.: 15/893,242

(22) Filed: Feb. 9, 2018

(65) Prior Publication Data

US 2019/0165643 A1    May 30, 2019

(30) Foreign Application Priority Data

Nov. 27, 2017 (KR) .......................... 10-2017-0159351

(51) Int. Cl.
*H02K 5/24* (2006.01)
*F16F 1/36* (2006.01)
*F16F 15/08* (2006.01)
*F16F 3/087* (2006.01)

(52) U.S. Cl.
CPC .................. *H02K 5/24* (2013.01); *F16F 1/36* (2013.01); *F16F 3/0876* (2013.01); *F16F 15/08* (2013.01); *F16F 2224/025* (2013.01)

(58) Field of Classification Search
CPC . H02K 5/24; H02K 5/26; H02K 11/33; H02K 1/2786; H02K 2203/03

USPC ....................... 310/51, 89, 91, 423
See application file for complete search history.

(56) References Cited

U.S. PATENT DOCUMENTS

| 5,969,445 | A  | * | 10/1999 | Horiuchi | ................ | H02K 11/40 |
|           |    |   |         |          |                  | 310/64 |
| 2002/0053843 | A1 | * | 5/2002 | Sunaga | .................... | H02K 3/50 |
|           |    |   |         |          |                  | 310/68 R |
| 2011/0101800 | A1 | * | 5/2011 | Schiel | ................ | F04D 25/0606 |
|           |    |   |         |          |                  | 310/51 |
| 2017/0338715 | A1 | * | 11/2017 | Li | .......................... | H02K 1/146 |

* cited by examiner

*Primary Examiner* — Michael Andrews
(74) *Attorney, Agent, or Firm* — Mintz Levin Cohn Ferris Glovsky and Popeo, P.C.; Jhongwoo Peck

(57) ABSTRACT

A motor equipped with dampers for reducing the vibration and noise of a rotator is disclosed. The motor includes: a stator block configured such that a core around is fastened and installed in the upper outer portion of the inside of a cover; a printed circuit board (PCB) fastened and installed below the stator block inside a motor housing; a shaft installed inside the stator block; and a rotor configured to include a magnet; wherein the motor housing includes an upper cover and a lower cover, a plurality of fastening portions is formed on the upper cover, and a plurality of fastening depressions is formed on the lower cover; and wherein the motor further includes dampers configured to receive and accommodate the fastening portions, to be inserted over side surfaces of the base portion of the stator block, and to cancel vibration and noise.

10 Claims, 5 Drawing Sheets

MOTORS WITH DAMPER FOR REDUCING VIBRATION AND NOISE OF ROTOR

BACKGROUND

1. Technical Field

The present disclosure relates to a motor equipped with dampers for reducing the vibration and noise of a rotator, and more specifically to a motor equipped with dampers for reducing the vibration and noise of a rotator, in which a stator block provided in the motor is provided with dampers for preventing shock and noise, thereby reducing vibration and noise generated when the rotator is rotated.

2. Description of the Related Art

Unless otherwise indicated herein, the content described in this section is not prior art to the claims in this application, and is not admitted to be prior art by inclusion in this section.

Recently, in order to increase energy efficiency, three-phase brushless DC motors, which are controlled by inverters, have been increasingly used in household appliances, such as automobiles, air conditioners, washing machines.

A brushless DC (BLDC) motor is also called a commutatorless motor. A BLDC motor is a motor which is driven to generate torque by switching current flowing through a stator winding through electronic circuit switching using power switching semiconductor devices, such as transistors, MOSFETs, and insulated gate bipolar transistors (IGBTs), instead of brushes and a commutator, which are important components of common DC motors.

Accordingly, brushless DC motors have current-to-torque and speed-to-voltage characteristics similar to DC motors in the structure of synchronous motors. Due to high efficiency and high power density, brushless DC motors are increasingly being used in applications ranging from home appliances to industrial apparatuses.

Three-phase brushless DC motors can more easily control torque, has higher efficiency, and are more advantageous in terms of noise than single-phase motors. Accordingly, most large loads are handled in a three-phase way. In such a brushless DC motor, three coils are disposed to face a permanent magnet, i.e., a rotor, as a stator so that the three coils have an electrical phase difference of 120 degrees. When the stator coils having respective phases are selectively energized through switching elements, the rotor is rotated by the magnetic force acting between the magnetic poles of a magnetized core and the permanent magnet.

Such brushless DC motors are used as drive sources for blower motors which are used in air conditioners for vehicles. An example is disclosed in Korean Patent No. 10-1169044 of patent document 1.

The blower motor disclosed in the above document includes: a stator block 10 configured such that a core 12 around which a coil is wound is fastened and installed in the upper outer portion of the inside of a cover 11 provided above the stator block 10; a printed circuit board (PCB) 20 fastened and installed below the stator block 10 inside a motor housing 22 while being associated with the core 12 via a terminal 21; a shaft 30 installed inside the stator block 10 such that the shaft 30 can be freely rotated via an upper bearing 13 and a lower bearing 14; and a rotor 50 configured to include a magnet 40 which is fastened and installed onto the lower end portion of the shaft 30 by a fastening washer 41 and which is rotated along with the shaft 30 when the shaft 30 is rotated.

In this case, the motor housing 22 includes an upper cover and a lower cover. The upper cover and the lower cover are coupled by means of a force-fitting method using protrusions and depressions configured to receive the protrusions or a screw fastening method using bolts or the like. For this purpose, the upper cover and the lower cover are provided with fastening portions to which one of the fastening methods is applied.

In this case, the base surface of the stator block 10 is commonly located in the lower side of the upper cover, and a heat sink is commonly located in the upper side of the lower cover.

However, in the motor having the above-described structure, the stator block 10 is provided in the state of being in contact with the upper cover and the lower cover, and thus a problem arises in that vibration shock is directly applied when the rotor is rotated, which results in a problem in which the efficiency of a motor is degraded.

Furthermore, the vibration and noise generated when a rotor is rotated are not cancelled in the motor having the above-described structure. For this purpose, there is a need for an innovative scheme for suppressing the generation of vibration and noise without a significant change in a conventional structure.

PRIOR ART DOCUMENTS

Patent Documents (Patent document 1) 1. Korean Patent No. 10-1169044 (issued on Jul. 20, 2012)

(Patent document 2) 2. Korean Patent Application No. 10-2009-0004253 (published on Jan. 12, 2009)

SUMMARY

An object of the present invention is to provide a motor equipped with dampers for reducing the vibration and noise of a rotor, which provides mobility against vibration shock in order to prevent the vibration shock from being directly applied when a rotor is rotated.

An object of the present invention is to provide a motor equipped with dampers for reducing the vibration and noise of a rotor, which can maximally maintain a conventional structure without a significant change in the overall structure of a conventional motor while suppressing the generation of vibration and noise by cancelling vibration and noise generated when a rotor is rotated.

An object of the present invention is to provide a motor equipped with dampers for reducing the vibration and noise of a rotor, which can cancel vibration and noise generated by a rotor without a significant change in the overall structure of a conventional motor, so that cost attributable to a change in design is not incurred, thereby providing economic efficiency, and which has a simple structure, so that the present invention can be easily applied to various types of motors, thereby providing high applicability.

According to an embodiment, there is provided a motor equipped with dampers for reducing the vibration and noise of a rotor, the motor including: a stator block configured such that a core around which a coil is wound is fastened and installed in the upper outer portion of the inside of a cover provided above and outside the stator block; a printed circuit board (PCB) fastened and installed below the stator block inside a motor housing while being associated with the core via a terminal; a shaft installed inside the stator block such that the shaft can be freely rotated via an upper bearing and a lower bearing; and a rotor configured to include a magnet which is fastened and installed onto the lower end portion of the shaft by a fastening washer and which is rotated along with the shaft when the shaft is rotated; wherein the motor housing includes an upper cover and a lower cover coupled to each other by means of a screw fastening method, a plurality of fastening portions configured to protrude toward the outside is formed on the upper cover, and a plurality of fastening depressions corresponding to the fastening portions is formed on the lower cover; and wherein the motor further includes dampers configured to receive and accommodate the fastening portions, to be inserted over side surfaces of the base portion of the stator block, and to cancel vibration and noise generated when a rotator including the shaft and the rotor is rotated.

According to an embodiment, the dampers are inserted over the corners of the stator block through which the outer circumferences of the fastening portions are accommodated, and reduce vibration and noise through contact with the stator block and the motor housing.

According to an embodiment, the dampers are made of a rubber material having elasticity.

According to an embodiment, the dampers are each configured such that cutout slits configured such that the motor housing is inserted thereinto are formed through respective side surfaces of the damper and a through hole configured such that a corresponding one of the fastening portions is passed therethrough is formed through the center portion of the damper.

The above-described motor equipped with dampers for reducing the vibration and noise of a rotator has the advantage of providing mobility against vibration shock in order to prevent the vibration shock from being directly applied when a rotator is rotated.

The above-described motor equipped with dampers for reducing the vibration and noise of a rotator has the advantage of maximally maintaining a conventional structure without a significant change in the overall structure of a conventional motor while suppressing the generation of vibration and noise by cancelling vibration and noise generated when a rotator is rotated.

The above-described motor equipped with dampers for reducing the vibration and noise of a rotator has the advantage of cancelling vibration and noise generated by a rotator without a significant change in the overall structure of a conventional motor, so that cost attributable to a change in design is not incurred, thereby providing economic efficiency, and the advantage of having a simple structure, so that the present invention can be easily applied to various types of motors, thereby providing high applicability.

DETAILED DESCRIPTION

Figure 1:
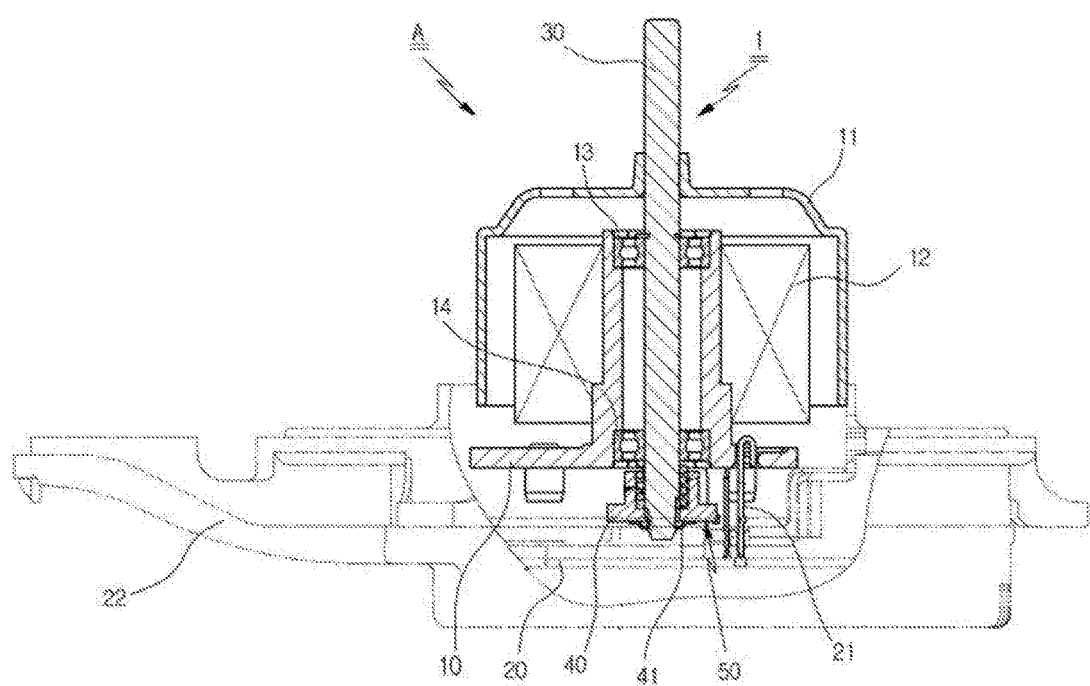
FIG. 1 is a view illustrating a brushless DC motor.

Advantages and features of the present invention and methods for achieving them will be apparent upon referring to embodiments described later in detail together with the accompanying drawings. However, the present invention is not limited to the embodiments disclosed below, but may be embodied in various different forms. These embodiments are provided merely to make the disclosure of the present invention complete and fully convey the scope of the present invention to a person having ordinary knowledge in the art to which the present invention pertains. The present invention is defined only based on the scopes of the claims. The same reference numerals designate the same elements throughout the present specification.

In the description of the embodiments of the present invention, when it is determined that a detailed description of a related well-known function or element may make the gist of the present invention obscure, the detailed description will be omitted. The terms to be described later are the terms defined by considering their functions in the embodiments of the present invention, and the meanings of the terms may vary depending on the intention of a user or operator, a practice, or the like. Therefore, the definitions of the terms should be made based on the overall content of the present specification.

A motor equipped with dampers for reducing the vibration and noise of a rotator according to an embodiment of the present disclosure is a motor equipped with dampers for reducing the vibration and noise of a rotator, in which a stator block provided in the motor is provided with dampers for preventing shock and noise, thereby reducing vibration and noise generated when the rotator is rotated. Illustrations and descriptions of elements to be easily understood by persons skilled in the art, such as a motor, a bearing, a printed circuit board (PCB), a shaft, a magnet, a washer, a damper, etc., and their functions will be abridged or omitted.

Figure 2:
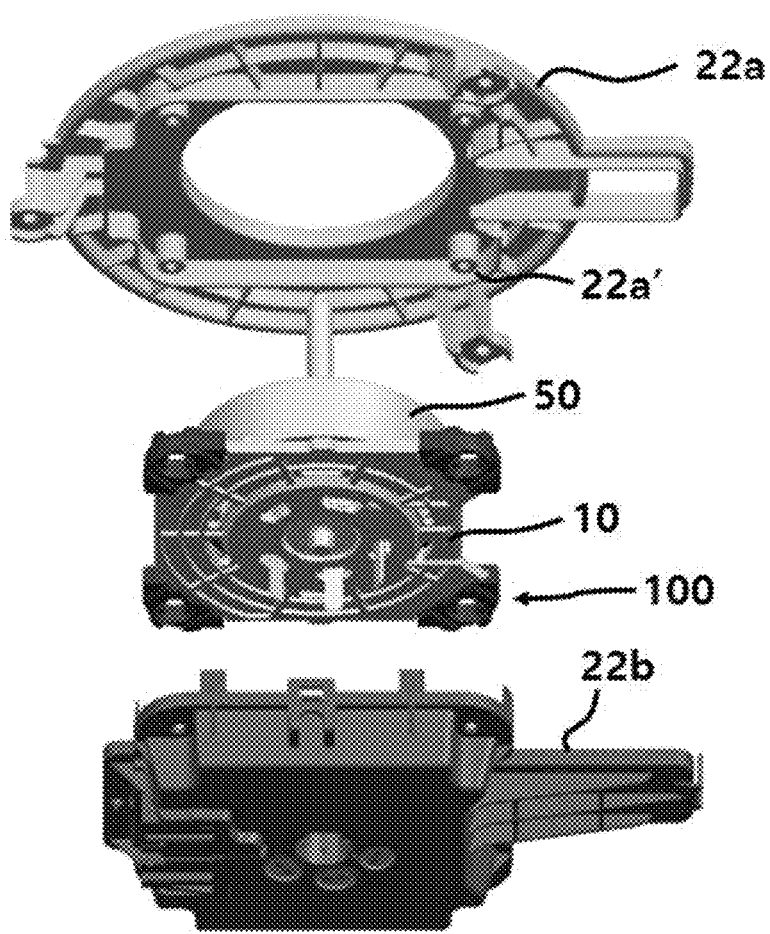
FIG. 2 is a view illustrating a motor equipped with dampers for reducing the vibration and noise of a rotator according to an embodiment of the present disclosure.
Figure 3:
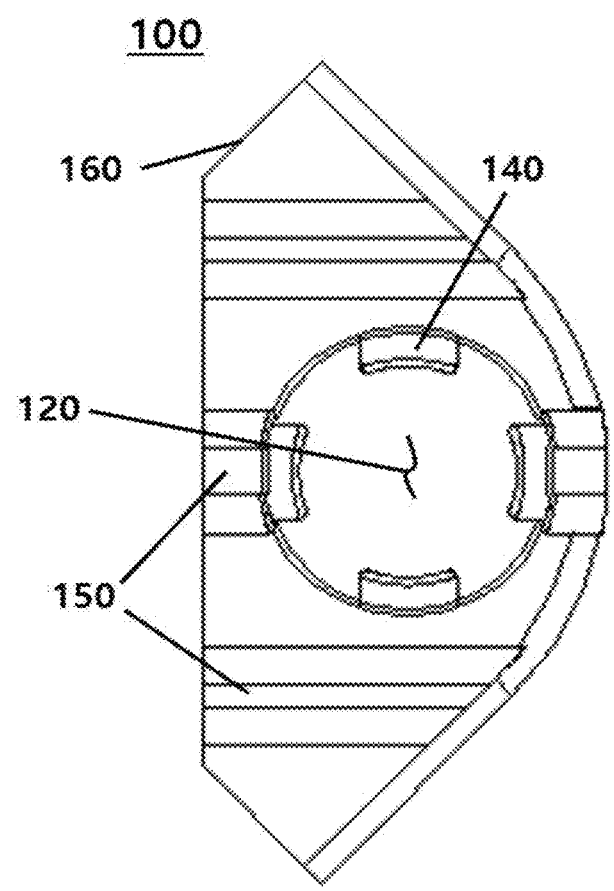
FIG. 3 is a plan view of a damper provided in the present disclosure.
Figure 4:
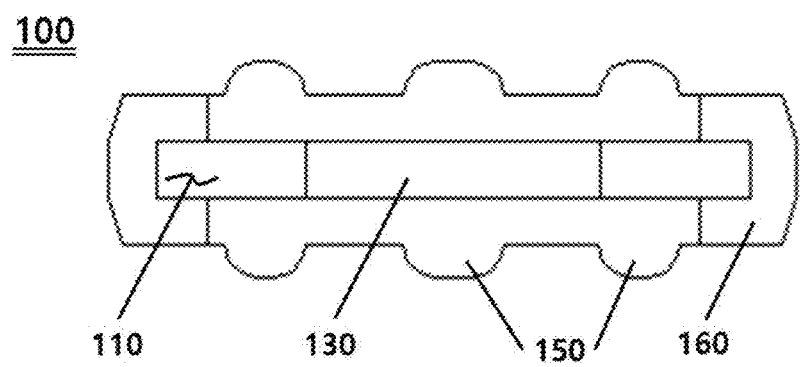
FIG. 4 is a front view of the damper provided in the present disclosure.
Figure 5:
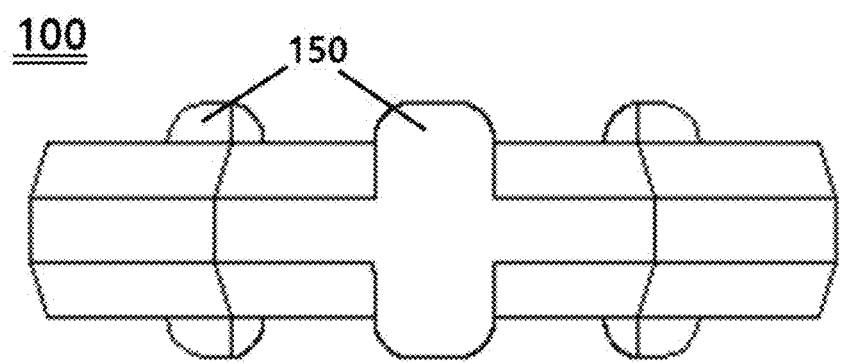
FIG. 5 is a rear view of the damper provided in the present disclosure.

FIG. 2 is a view illustrating a motor equipped with dampers for reducing the vibration and noise of a rotator according to an embodiment of the present disclosure, FIG. 3 is a plan view of a damper provided in the present disclosure, FIG. 4 is a front view of the damper provided in the present disclosure, and FIG. 5 is a rear view of the damper provided in the present disclosure.

Referring to FIGS. 1 to 5, the motor equipped with dampers for reducing the vibration and noise of a rotator according to the embodiment of the present disclosure includes a stator block 10, a PCB 20, a shaft 30, and a rotor 50.

The stator block 10 is configured such that a core 12 around which a coil is wound is fastened and installed in the upper outer portion of the inside of a cover 11 provided above and outside the stator block 10.

The stator block 10 has an inverted-T sectional shape. The upper portion of the stator block 10 is formed in a hollow cylindrical shape. The shaft 30 and upper and lower bearings 13 and 14 inserted and spaced apart from each other are disposed inside the upper portion of the stator block 10. The base surface of the stator block 10 is formed in a rectangular plate shape. Holes configured such that bolts are passed therethrough when a motor housing 22 to be described below is fastened by the bolts or the like are formed through the corners of the base surface of the stator block 10.

The PCB 20 is fastened and installed below the stator block 10 inside the motor housing 22 while being associated with the core 12 via a terminal 21.

The shaft 30 is installed inside the stator block 10 such that the shaft 30 can be freely rotated via the upper bearing 13 and the lower bearing 14.

The rotor 50 includes a magnet 40 fastened and installed onto the lower end portion of the shaft 30 by a fastening washer 41 and configured to be rotated along with the shaft 30 when the shaft 30 is rotated.

Meanwhile, the above-described motor housing 22 according to the present disclosure includes an upper cover 11 and a lower cover 11 which are coupled to each other by means of a screw fastening method via bolts or the like. A plurality of fastening portions 22a' configured to protrude toward the outside is formed on the upper cover 11, and a plurality of fastening depressions (to which a reference numeral is not allocated) corresponding to the fastening portions 22a' is formed on the lower cover 11.

In this case, although the motor housing 22 has been described as being configured such that the upper cover 11 and the lower cover 11 are coupled to each other by means of a screw fastening method via bolts or the like, the upper cover 11 and the lower cover 11 may be coupled to each other by means of one of various methods, such as a force-fitting method in which protrusions are formed on any one of the upper cover 11 and the lower cover 11, depressions configured such that the protrusions are fitted thereinto are formed on the other, and the protrusions and the depressions are coupled to each other, and the like.

The above-described present disclosure is characterized in that it has a structure similar to that of a conventional motor and it is provided with dampers 100 for preventing the shock and noise of a stator block and thus reduces vibration and noise generated when the rotator is rotated. This will be described below.

The dampers 100 receive and accommodate the fastening portions 22a' and are inserted over the side surface of the base portion of the stator block 10, as shown in FIG. 2, and thus they cancel vibration and noise generated when the rotator 50 including the shaft 30 and the rotor 50 is rotated.

These dampers 100 are inserted over the corners of the stator block 10 through which the outer circumferences of the fastening portions 22a' are accommodated, and reduce vibration and noise through contact with the stator block 10 and the motor housing 22. For this purpose, the dampers 100 are made of a rubber material having elasticity.

In this case, as shown in FIG. 3, each of the dampers 100 is formed in an isosceles triangle shape whose two sides have the same length. The corner of the damper 100 corresponding to the apex angle of an isosceles triangle is rounded, and each of the corners of the damper 100 corresponding to the base angles of the isosceles triangle corner is formed in the state of being partially cut away. It will be apparent that the damper 100 may have one of various shapes other than an isosceles triangle shape.

In the damper 100, cutout slits 110 configured such that the motor housing 22 is inserted thereinto are formed through respective side surfaces corresponding to the cutaway corners, as shown in FIG. 4, and a through hole 120 configured such that a corresponding one of the fastening portions 22a' is passed therethrough is formed through the center portion of the damper 100, as shown in FIG. 3. Accordingly, corresponding corners of the base surface of the stator block 10 may be inserted and fastened into the cutout slits 110, and the corresponding one of the fastening portions 22a' may be passed through the through hole 120.

The above-described damper 100 further includes a movement limiting surface 130, center protrusions 140, side protrusions 150, and movement prevention surfaces 160.

Referring to FIGS. 3 and 4, the movement limiting surface 130 of the damper 100 is formed in a cylindrical shape such that the through hole 120 is formed at the center of the damper 100, and the central side of the outer circumferential surface of the movement limiting surface 130 is located around the cutout slits 110 such that the through hole 120 and the cutout slits 110 are prevented from communicating with each other. Accordingly, the corners of the base surface of the stator block 10 are inserted into the cutout slits 110, and also the further entry and movement of the corners are prevented by the movement limiting surface 130. In this case, the outer circumferential surface of the movement limiting surface 130 is formed in a circular shape. Accordingly, it is preferred that the corner of the base surface of the stator block 10 is rounded and comes into tight contact with the movement limiting surface 130. This enables the formation of the through hole 120 of the damper 100 and the prevention of removal and movement.

The center protrusions 140 are formed along the inner circumferential surface of the movement limiting surface 130 to be spaced apart from each other at regular intervals, as shown in FIG. 3, and support the outer circumferential surface of the fastening portion 22a' inserted into the through hole 120. Accordingly, the center protrusions 140 provide mobility and secure support to the stator block 10 against vibration and shock.

In this case, although the center protrusions 140 are configured to include a plurality of segments and to support the outer circumferential surface of the fastening portion 22a' through point contact, the center protrusions 140 may be formed in an integrated circular band shape and entirely come into surface contact with the outer circumferential surface of the fastening portion 22a'. The inner ends of the center protrusions 140 are formed in an internally concave shape, but the shape of the inner ends of the center protrusions 140 is not limited thereto.

As shown in FIGS. 4 and 5, the side protrusions 150 are provided at symmetrical locations of the top and bottom surfaces of the damper 100, and are formed on each of the top and bottom surfaces to be spaced apart from each other. The side protrusions 150 come into contact with the bottom surface of the upper cover 11 and the top surface of the lower cover 11. Although the side protrusions 150 are formed in an externally convex shape, the shape of the side protrusions 150 is not limited thereto. It will be apparent that the side protrusions 150 may be formed in one of various shapes, such as an internally convex shape, a non-convex planar shape, etc.

As shown in FIG. 3, each of the movement prevention surfaces 160 corresponds to a cutaway surface formed by partially cutting away each of the corners corresponding to the base angles of the damper 100 having an isosceles triangle shape. This movement prevention surface 160 enables the damper 100 inserted over the stator block 10 to be supported in a lateral direction, and thus provides secure support against movement in the lateral direction. For this purpose, the corners of the base surface of the stator block 10 are preferably formed in a shape corresponding to that of the movement prevention surface 160. The thickness of the portion of the base surface of the stator block 10 over which the damper 100 is inserted is preferably formed to be small, and thus the side surfaces of the damper 100 in which the cutout slits 110 are formed can be supported by the base surface of the stator block 10. Accordingly, movement in a lateral direction can be more securely supported.

The above-described motor equipped with dampers for reducing the vibration and noise of a rotator has the advantage of providing mobility against vibration shock in order to prevent the vibration shock from being directly applied when a rotator is rotated, has the advantage of maximally maintaining a conventional structure without a significant change in the overall structure of a conventional motor while suppressing the generation of vibration and noise by cancelling vibration and noise generated when a rotator is rotated, and has the advantage of cancelling vibration and noise generated by a rotator without a significant change in the overall structure of a conventional motor, so that cost attributable to a change in design is not incurred, thereby providing economic efficiency, and the advantage of having a simple structure, so that the present invention can be easily applied to various types of motors, thereby providing high applicability.

The disclosed content is merely examples, and the present invention may be modified and practiced in various manners without departing from the gist of the present invention claimed in the attached claims by a person having ordinary knowledge in the art to which the present invention pertains. Therefore, the range of protection of the present invention is not limited to the above-described specific embodiments.

DESCRIPTION OF REFERENCE NUMERALS

10: stator block
11: cover
12: core
13: upper bearing
14: lower bearing
20: PCB
21: terminal
22: motor housing
22a: upper cover
22a': fastening portions
22b: lower cover
30: shaft
40: magnet
41: fastening washer
50: rotator
100: damper
110: cutout slit
120: through hole
130: movement limiting surface
140: center protrusion
150: side protrusion
160: movement prevention surface

What is claimed is:

1. A motor equipped with dampers for reducing vibration and noise of a rotator, the motor comprising:
a stator block configured such that a core around which a coil is wound is fastened and installed in an upper outer portion of an inside of a cover provided above and outside the stator block;
a printed circuit board (PCB) fastened and installed below the stator block inside a motor housing while being associated with the core via a terminal;
a shaft installed inside the stator block such that the shaft can be freely rotated via an upper bearing and a lower bearing; and
a rotor configured to include a magnet which is fastened and installed onto a lower end portion of the shaft by a fastening washer and which is rotated along with the shaft when the shaft is rotated;
wherein the motor housing includes an upper cover and a lower cover coupled to each other by means of a screw fastener, a plurality of fastening portions configured to protrude toward an outside is formed on the upper cover, and a plurality of fastening depressions corresponding to the fastening portions is formed on the lower cover; and
wherein the motor further comprises dampers configured to receive and accommodate the fastening portions, to be inserted over side surfaces of a base portion of the stator block, and to cancel vibration and noise generated when a rotator including the shaft and the rotor is rotated, and
wherein the dampers are each formed with cutout slits, configured such that the motor housing is inserted therein, formed through respective side surfaces of the damper.

2. The motor of claim 1, wherein the dampers are inserted over corners of the stator block through which outer circumferences of the fastening portions are accommodated, and reduce vibration and noise through contact with the stator block and the motor housing.

3. The motor of claim 1, wherein the dampers are made of a rubber material having elasticity.

4. The motor of claim 1, therein a through hole, configured such that a corresponding one of the fastening portions is passed therethrough, is formed through a center portion of the damper.

5. The motor of claim 4, wherein the dampers further include a movement limiting surface formed in a cylindrical shape such that the through hole is formed at the center of the damper while prevented from communicating with the cutout slits.

6. The motor of claim 5, wherein the dampers further include a center protrusion formed along an inner circumferential surface of the movement limiting surface to support outer circumferential surfaces of the fastening portions.

7. The motor of claim 6, wherein the center protrusion is configured as a plurality of segments.

8. The motor of claim 6, wherein the center protrusion is configured as a circular band.

9. The motor of claim 1, wherein the dampers further include a movement prevention surface to provide a support against a lateral movement of the stator block.

10. The motor of claim 1, wherein the dampers further include side protrusions provided on a top surface and a bottom surface thereof.

* * * * *